(12) United States Patent  
Ejiri

(10) Patent No.: US 7,381,484 B2  
(45) Date of Patent: *Jun. 3, 2008

(54) MAGNETIC RECORDING TAPE

(75) Inventor: Kiyomi Ejiri, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 520 days.

This patent is subject to a terminal disclaimer.

(21) Appl. No.: 11/043,926

(22) Filed: Jan. 28, 2005

(65) Prior Publication Data

US 2005/0170216 A1   Aug. 4, 2005

(30) Foreign Application Priority Data

Jan. 30, 2004 (JP) .......................... P. 2004-024643

(51) Int. Cl.  
*G11B 5/64* (2006.01)  
*G11B 5/78* (2006.01)

(52) U.S. Cl. ............................... 428/845.1; 428/847.8; 428/847.2; 360/134

(58) Field of Classification Search ........... 428/837, 428/846, 847, 847.2, 847.3, 847.4, 847.7, 428/847.8, 475.2, 845.1; 427/127, 128, 129, 427/130, 131; 360/134, 135  
See application file for complete search history.

(56) References Cited

U.S. PATENT DOCUMENTS 5,922,483 A    7/1999  Takahashi et al.  
6,713,155 B1*  3/2004  Handa et al. ............ 428/847.4  
2001/0008714 A1* 7/2001  Sueoka et al. .............. 428/847

FOREIGN PATENT DOCUMENTS

| EP | 0 567 279 A1 | 10/1993 |
| EP | 1 033 244 A2 | 9/2000 |
| EP | 1 118 980 A1 | 7/2001 |
| EP | 1142936 | * 10/2001 |
| JP | 7-6351 A | 1/1995 |
| JP | 8-45060 A | 2/1996 |
| JP | 11-259851 A | 9/1999 |
| WO | WO 00/79524 | * 12/2000 |

OTHER PUBLICATIONS

JA 08—045060—English Abstract.*  
JA 08—045060—Translation.*  
JA 07-006351—English Abstract.*  
JA 07-006351—Translation.*  
European Search Report dated Apr. 4, 2005.

* cited by examiner

*Primary Examiner*—Carol Chaney  
*Assistant Examiner*—Louis Falasco  
(74) *Attorney, Agent, or Firm*—Sughrue Mion, PLLC

(57) ABSTRACT

A magnetic recording tape comprising a magnetic layer, a flexible support and a back coat layer in this order, wherein the support is a polyester film having an intrinsic viscosity of from 0.40 to 0.60 dl/g and a number average molecular weight of from 12,000 to 24,000, a surface of the back coat layer has protrusions having a height of 100 nm or more measured with an atomic force microscope in a density of from 10 to 500 in 90 μm square, and a ratio of a total number of protrusions having a height of 50 nm or more on the surface of the back coat layer to a total number of protrusions having a height of 100 nm or more on the surface of the back coat layer is from 10 to 100.

8 Claims, No Drawings

MAGNETIC RECORDING TAPE

FIELD OF THE INVENTION

The present invention relates to a magnetic recording tape for high density recording improved in electromagnetic characteristics and weaving of an edge due to running.

BACKGROUND OF THE INVENTION

Magnetic recording media are widely used as the recording media of all sorts of data such as audios, images and letters. In recent years, the requirements for high density recording have risen in correspondence with the increment of the capacity of data to be recorded and the improvement of transfer rate, and magnetic recording media having high electromagnetic characteristics are wanted. Further, the reliability in the repeating use of a medium is also required at the same time. Therefore, running properties have been improved by providing a back coat layer, in particular in a tape medium. For improving running properties by a back coat layer, providing protrusions on the base surface to roughen the surface of a back coat layer to thereby improve the running durability has been conventionally tried. However, when the surface of a back coat layer is too roughened by this method, the back coat layer and the magnetic layer are tightly pressed in winding the magnetic recording tape on a hub for the purpose of storage or process, and so-called "imprinting of back coat" occurs, i.e., the magnetic layer is infected with the unevenness of the back coat layer, which results in the reduction of electromagnetic characteristics. For solving the problem of imprinting of back coat, smoothing the surface of a back coat layer has been tried. However, when a back coat layer is smoothed, the air entrained by winding is difficult to come out, as a result irregular winding such as protrusion of the tape is liable to occur. When irregular winding occurs, a tape edge is woven by being brought into contact with the flange of the controlling guide during running of the tape that generates the increment of dropout. The thickness of a magnetic tape is thinned in recent years, so that the problem of weaving of an edge has become serious.

As the conventional example of a trial to better electromagnetic characteristics by smoothing a back coat layer to thereby improve so-called imprinting of back coat (back imprinting), an example of a back coat layer mainly comprising the mixture of granular titanium oxide and carbon black is disclosed in JP-A-11-259851 (The term "JP-A" as used herein refers to an "unexamined published Japanese patent application".). JP-A-11-259851 also proposes the use of acicular nonmagnetic powder. However, the back coat layer becomes smooth and imprinting of back coat certainly reduces by using these powders, but the back coat layer becomes too smooth and the friction coefficient increases, as a result, the tension during running rises, which results in the increase of dropout. With respect to supports, JP-A-7-6351 and JP-A-8-45060 disclose the molecular weights and viscosities. Both literatures disclose that high edge can be prevented by using polyester-2,6-naphthalate (hereinafter sometimes referred to as "PEN") having a molecular prescribed to 8,000 to 16,000 or PEN having a viscosity prescribed to 0.45 to 0.53, but these supports are not provided with the back coat layer prescribed in the present invention, so that these are insufficient to achieve high durability. Thus, a magnetic recording tape can not satisfy both of electromagnetic characteristics and the restraint of weaving of an edge by conventional techniques. In particular, in these days when it is required to thin the thickness of a magnetic recording tape as a whole, although a magnetic recording tape having good electromagnetic characteristics and edge quality is required, such a magnetic recording tape is not provided yet.

SUMMARY OF THE INVENTION

In view of the problems of the prior art, an object of the invention is to provide a magnetic recording tape hardly accompanied by imprinting of back coat and generation of dropout due to weaving of an edge.

As a result of eager investigation to achieve the above object, the present inventors have found that electromagnetic characteristics can be compatible with the prevention of the increase of dropout attendant upon running by compromising back imprinting and the reduction of friction coefficient by prescribing the distribution of the protrusion density on a back coat to a specific range, and realizing an edge difficult to be scraped off by prescribing the molecular weight of a support to a specific range. That is, the present invention is as follows.

(1) A magnetic recording tape comprising a flexible support having provided on one side a magnetic layer and on the other side a back coat layer, wherein the support is a polyester film having an intrinsic viscosity of from 0.40 to 0.60 dl/g, a number average molecular weight of from 12,000 to 24,000, and the surface of the back coat layer has protrusions (projections) having a height of 100 nm or more measured with an atomic force microscope (AFM) in the density of from 10 to 500 in 90 μm square, and the ratio of the total number of the protrusions having a height of 50 nm or more (P50) and the total number of the protrusions having a height of 100 nm or more (P100), (P50/P100), is from 10 to 100.

(2) The magnetic recording tape as described in the above item (1), wherein the flexible support comprises two or more layers, and the surface roughness of the support on the side having the magnetic layer (SRa) is 1 nm or more and less than 6 nm, and the surface roughness on the side having the back coat layer (SRb) is 6 nm or more and less than 10 nm.

According to the invention, a magnetic recording tape hardly accompanied by imprinting of back coat and generation of dropout due to weaving of an edge can be provided.

DETAILED DESCRIPTION OF THE INVENTION

A magnetic recording tape in the invention comprises a flexible support having a magnetic layer on one side and a back coat layer on the other side. It is also preferred that the magnetic recording tape in the invention is provided with layers other than a magnetic layer and a back coat layer, for example, a nonmagnetic layer containing nonmagnetic powder, a soft magnetic layer containing soft magnetic powder, a second magnetic layer, a cushioning layer, an overcoat layer, an adhesive layer and a protective layer are exemplified as such other layers. These layers can be provided at proper positions so as to effectively exhibit their functions. As the magnetic recording tape in the invention, it is preferred to have a nonmagnetic layer containing nonmagnetic inorganic powder and a binder between a flexible support and a magnetic layer.

In the invention, when a nonmagnetic layer is provided between a flexible support and a magnetic layer, the thickness of the magnetic layer may be from 0.01 to 1 μm, preferably from 0.03 to 0.5 μm, more preferably from 0.03 to 0.2 µm, and the nonmagnetic layer may be from 0.5 to 3 µm, preferably from 0.8 to 3 µm, and more preferably from 1 to 2.5 µm. The nonmagnetic layer is preferably thicker than the magnetic layer. It is also possible that the magnetic layer comprises two layers. When the magnetic layer comprises two layers, the upper layer may be from 0.2 to 2 µm, preferably from 0.2 to 1.5 µm, and the lower layer may be from 0.8 to 3 µm. When the magnetic layer comprises a single layer, the thickness is generally from 0.03 to 3 µm, preferably from 0.05 to 2 µm, and more preferably from 0.1 to 1.5 µm. Further, when a soft magnetic layer is provided between a flexible support and a magnetic layer, for example, the magnetic layer may be from 0.03 to 1 µm, and preferably from 0.05 to 0.5 µm, and the soft magnetic layer may be from 0.8 to 3 µm. A magnetic layer may be a coating type magnetic layer formed by dispersing ferromagnetic powder in a binder and coating as described later, or may be a thin film type magnetic layer formed by vacuum deposition or sputtering. In the case of the thin film type magnetic layer, the thickness is from 0.01 to 0.3 µm, preferably from 0.02 to 0.1 µm. The thickness of the back coat layer formed in the magnetic recording tape in the invention is from 0.05 to 1.0 µm, preferably from 0.1 to 0.8 µm, and more preferably from 0.2 to 0.6 µm.

Magnetic Layer

Ferromagnetic Powder:

As the ferromagnetic powders for use in a magnetic layer of the magnetic recording tape in the invention, ferromagnetic iron oxides, cobalt-containing ferromagnetic iron oxides, barium ferrite powders and ferromagnetic metal powders are preferably used.

Ferromagnetic powders have an $S_{BET}$ (specific surface area measured by a BET method) of from 40 to 80 $m^2/g$, preferably from 50 to 70 $m^2/g$, a crystallite size of from 5 to 25 nm, preferably from 8 to 15 nm, and particularly preferably from 8 to 12 nm. The crystallite size is the average value obtained from the half value width of diffraction peak with an X-ray diffractometer (RINT 2000 series, manufactured by Rigaku Denki Co.) on the conditions of radiation source CuKα1, tube voltage 50 kV and tube current 300 mA by Scherrer method. Ferromagnetic powders have a long axis length of from 0.02 to 0.25 µm, preferably from 0.03 to 0.2 µm, and particularly preferably from 0.03 to 0.15 µm, and pH of 7 or more.

The examples of ferromagnetic metal powders include simple metal powders or alloys, such as Fe, Ni, Fe—Co, Fe—Ni, Co—Ni and Co—Ni—Fe. The Co content in ferromagnetic metal powders is preferably Co/Fe=from 5/95 to 40/60, more preferably from 40/60, and still more preferably from 10/90 to 30/70. Further, ferromagnetic metal powders can contain the following metals in the proportion of 20 wt % or less of the metal components: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium and bismuth. Further, ferromagnetic metal powders may contain a small amount of water, a hydroxide or an oxide. Ferromagnetic metal powders may be subjected to surface treatment with Al, Si, P or oxides of these metals, if necessary, and the amount of the surface-treating compound is from 0.1 to 10% based on the amount of the ferromagnetic metal powders. By the surface treatment, the adsorption amount of lubricant, e.g., fatty acid, preferably becomes 100 mg/m² or less. Ferromagnetic metal powders sometimes contain soluble inorganic ions of, e.g., Na, Ca, Fe, Ni and Sr, but the properties of ferromagnetic metal powders are not particularly affected if the amount is 200 ppm or less. Ferromagnetic metal powders for use in the invention preferably have less voids and the value of the voids is preferably 20% by volume or less, and more preferably 5% by volume or less.

The coercive force (Hc) of ferromagnetic metal powders is preferably from 159.2 to 238.8 kA/m (from 2,000 to 3,000 Oe), more preferably from 167.2 to 230.8 kA/m (from 2,100 to 2,900 Oe). The saturation magnetization ($\sigma_s$) of ferromagnetic metal powders is preferably from 80 to 140 A·m²/kg (from 140 to 170 emu/g), more preferably from 90 to 130 A·m²/kg (from 145 to 160 emu/g). SFD (Switching Field Distribution) of magnetic powders themselves is preferably small, preferably 0.8 or less. When SFD is 0.8 or less, electromagnetic characteristics are excellent, high output can be obtained, magnetic flux revolution becomes sharp and peak shift becomes small, therefore, suitable for high density digital magnetic recording. To achieve small Hc distribution, making particle size distribution of goethite in ferromagnetic metal powders good, using monodispersed α-$Fe_2O_3$, and preventing sintering among particles are effective methods.

As the barium ferrite powders contained in a magnetic layer in the invention, specifically magnetoplumbite type barium ferrite and magnetoplumbite type barium ferrite partially containing spinel phase can be exemplified, and barium ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, barium ferrite powders containing the following elements can be used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and manufacturing methods, specific impurities may be contained. Barium ferrite powders may be subjected to surface treatment with Al, Si, P or oxides of these metals, if necessary, and the amount of the surface-treating compound is from 0.1 to 10% based on the amount of the barium ferrite powders.

The coercive force (Hc) of barium ferrite powders is preferably from 159 to 239 kA/m (from 2,000 to 3,000 Oe) or so. The coercive force (Hc) is preferably higher for high density recording but it is restricted by the ability of the recording head. Coercive force (Hc) can be controlled by the particle size, the kinds and amounts of the elements contained in the barium ferrite powder, the substitution sites of the elements, and the particle forming reaction conditions. The saturation magnetization ($\sigma_s$) of barium ferrite powder is generally from 30 to 80 A·m²/kg, preferably from 50 to 80 A·m²/kg.

The manufacturing methods of these ferromagnetic powders are well known, and the ferromagnetic powders for use in the invention can also be manufactured by well-known methods. The manufacturing methods of ferromagnetic metal powders include (1) a method of reducing a water-containing iron oxide having been subjected to sintering preventing treatment, or an iron oxide with reducing gas, e.g., hydrogen, to thereby obtain Fe or Fe—Co particles, (2) a method of reducing a composite organic acid salt (mainly an oxalate) with reducing gas, e.g., hydrogen, (3) a method of thermally decomposing a metal carbonyl compound, (4) a method of reduction by adding a reducing agent, e.g., sodium boron hydride, hypophosphite or hydrazine, to an aqueous solution of a ferromagnetic metal, and (5) a method of evaporating a metal in low pressure inert gas to thereby obtain powder. The thus-obtained ferromagnetic metal powders are subjected to well-known gradual oxidation treatment. As such treatment, a method of forming an oxide film on the surfaces of ferromagnetic metal powders by reducing a water-containing iron oxide or an iron oxide with reducing gas, e.g., hydrogen, and regulating partial pressure of oxygen-containing gas and inert gas, the temperature and the time is little in demagnetization and preferred.

The manufacturing methods of barium ferrite powders include (1) a glass crystallization method comprising the steps of mixing metallic oxide which substitutes barium oxide, iron oxide, iron with boron oxide as a glass-forming material so as to make a desired ferrite composition, melting and then quenching the ferrite composition to obtain an amorphous product, treating by reheating, washing and pulverizing the amorphous product, to thereby obtain barium ferrite crystal powder; (2) a hydrothermal reaction method comprising the steps of neutralizing a solution of barium ferrite composition metallic salt with an alkali, removing the byproducts produced, heating the liquid phase at 100° C. or more, washing, drying and then pulverizing, to thereby obtain barium ferrite crystal powder; and (3) a coprecipitation method comprising the steps of neutralizing a solution of barium ferrite composition metallic salt with an alkali, removing the byproducts produced and drying, treating the system at 1,100° C. or less, and then pulverizing to obtain barium ferrite crystal powder.

The shapes of ferromagnetic metal powders are not especially restricted, and any shape such as generally used acicular, granular, die-like, ellipsoidal and tabular shapes can be used, but it is particularly preferred to use acicular ferromagnetic powders.

A magnetic layer-forming coating solution is prepared by kneading and dispersing a binder, a hardening agent and ferromagnetic powder with a solvent usually used in the preparation of a magnetic coating solution, e.g., methyl ethyl ketone, dioxane, cyclohexanone, ethyl acetate or toluene. Kneading and dispersion can be performed according to ordinary methods. Besides the above components, a magnetic layer forming coating solution may contain usually used additives or fillers, such as an abrasive, e.g., $\alpha$-$Al_2O_3$ and $Cr_2O_3$, an antistatic agent, e.g., carbon black, a lubricant, e.g., fatty acid, fatty acid ester and silicone oil, and a dispersant.

Binder:

Conventionally well-known thermoplastic resins, thermosetting resins, reactive resins and the mixtures of these resins are used as the binders in a magnetic layer in the invention. The examples of thermoplastic resins include polymers or copolymers containing vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether as the constitutional unit; polyurethane resins and various rubber resins.

The examples of thermosetting resins and reactive resins include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Thermoplastic resins, thermosetting resins and reactive resins are described in detail in *Plastic Handbook*, Asakura Shoten.

When an electron beam-curable resin is used in a magnetic layer, not only film strength and durability are improved but also surface smoothness and electromagnetic characteristics are further improved. The examples of these resins and manufacturing methods are disclosed in JP-A-62-256219 in detail.

The above resins can be used alone or in combination. It is particularly preferred to use polyurethane resins. It is more preferred to use hydrogenated bisphenol A; polyurethane resins obtained by reacting a compound having a cyclic structure such as polypropylene oxide adduct of hydrogenated bisphenol A, polyol having an alkylene oxide chain and a molecular weight of from 500 to 5,000, polyol having a cyclic structure and a molecular weight of from 200 to 500 as the chain extender, and organic diisocyanate, and introducing a polar group thereto; polyurethane resins obtained by reacting aliphatic dibasic acid such as succinic acid, adipic acid or sebacic acid, polyester polyol comprising aliphatic diol having a branched alkyl side chain and not having a cyclic structure such as 2,2-dimethyl-1,3-propanediol, 2-ethyl-2-butyl-1,3-propane-diol, or 2,2-diethyl-1,3-propanediol, aliphatic diol having a branched alkyl side chain and having 3 or more carbon atoms such as 2-ethyl-2-butyl-1,3-propanediol or 2,2-diethyl-1,3-propanediol as the chain extender, and an organic diisocyanate compound, and introducing a polar group thereto; or polyurethane resins obtained by reacting a compound having a cyclic structure such as dimer diol, a polyol compound having a long alkyl chain, and organic diisocyanate, and introducing a polar group thereto.

The average molecular weight of polar group-containing polyurethane resins usable in the invention is preferably from 5,000 to 100,000, more preferably from 10,000 to 50,000. When the average molecular weight is 5,000 or more, the obtained magnetic layer is not accompanied by the reduction of physical strength, such as the brittleness of the layer, and the durability of the magnetic recording tape is not influenced. While when the average molecular weight is 100,000 or less, the solubility in a solvent does not decrease, so that good dispersibility can be obtained, in addition, the coating viscosity in the prescribed concentration does not increase, so that good working properties can be obtained and handling becomes easy.

As the polar groups contained in the above polyurethane resins, —COOM, —$SO_3M$, —$OSO_3M$, —P=O(OM)$_2$, —O—P=O(OM)$_2$ (wherein M represents a hydrogen atom or an alkali metal salt group), —OH, —$NR_2$, —$N^+R_3$ (wherein R represents a hydrocarbon group), an epoxy group, —SH and —CN are exemplified. Polyurethane resins to which one or more of these polar groups are introduced by copolymerization or addition reaction can be used. When these polar group-containing polyurethane resins have an OH group, to have a branched OH group is preferred from the aspects of curability and durability, to have from 2 to 40 branched OH groups per a molecule is preferred, and to have from 3 to 20 groups is more preferred. The amount of these polar groups is from $10^{-1}$ to $10^{-8}$ mol/g, preferably from $10^{-2}$ to $10^{-6}$ mol/g.

The addition amount of binders for use in a magnetic layer of the invention is from 5 to 50 mass % (weight %), preferably from 10 to 30 mass %, based on the mass of the ferromagnetic powder. When polyurethane resins are used, the amount is from 2 to 20 mass %, when polyisocyanate is used, the amount is from 2 to 20 mass %, and it is preferred to use them in combination, however, for instance, when corrosion of the head is caused by a slight amount of chlorine due to dechlorination, it is possible to use polyurethane alone or a combination of polyurethane and isocyanate alone. When a vinyl chloride resin is used as other resin, the addition amount is preferably from 5 to 30 mass %. When polyurethane is used in the invention, the polyurethane has a glass transition temperature of preferably from −50 to 150° C., more preferably from 0 to 100° C., breaking extension of preferably from 100 to 2,000%, breaking stress of preferably from 0.49 to 98 MPa (from 0.05 to 10 kg/mm$^2$), and a yielding point of preferably from 0.49 to 98 MPa (from 0.05 to 10 kg/mm$^2$).

A magnetic recording tape for use in the invention may have a constitution having two or more layers on one side of a flexible support. Accordingly, the amount of the binder, the amounts of vinyl chloride resins, polyurethane resins, polyisocyanate or other resins contained in the binder, the molecular weight and the amount of polar groups of each resin constituting the magnetic layer, or the physical properties of the above described resins can of course be varied in the nonmagnetic layer and each magnetic layer, according to necessity. These factors should be rather optimized in respective layers, and well-known prior arts with respect to multilayer magnetic layers can be used in the invention. For example, when the amount of a binder is varied in each layer, it is effective to increase the amount of a binder contained in a magnetic layer to reduce scratches on the surface of the magnetic layer. For improving the head touch against a head, it is effective to increase the amount of a binder in a nonmagnetic layer to impart flexibility.

The examples of polyisocyanates usable in the invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; products of these isocyanates with polyalcohols; and polyisocyanates formed by condensation reaction of isocyanates. These compounds may be used alone, or in combination of two or more in each layer taking advantage of the difference in curing reactivity.

If necessary, additives can be added to a magnetic layer in the invention. As the additives, an abrasive, a lubricant, a dispersant, an auxiliary dispersant, an antifungal agent, an antistatic agent, an antioxidant, a solvent and carbon black can be exemplified. The examples of additives usable in the invention include molybdenum disulfide, tungsten disulfide, graphite, boron nitride, graphite fluoride, silicone oil, silicone having a polar group, fatty acid-modified silicone, fluorine-containing silicone, fluorine-containing alcohol, fluorine-containing ester, polyolefin, polyglycol, polyphenyl ether, aromatic ring-containing organic phosphonic acid, e.g., phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, and alkali metal salt of these organic phosphonic acids, alkyl-phosphonic acid, e.g., octylphosphonic acid, 2-ethylhexyl-phosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, and alkali metal salt of these alkylphosphonic acids, aromatic phosphoric ester, e.g., phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, toluyl phosphate, xylyl phosphate, ethylphenyl phosphate, cumenyl phosphate, propylphenyl phosphate, butylphenyl phosphate, heptylphenyl phosphate, octylphenyl phosphate, nonylphenyl phosphate, and alkali metal salt of these aromatic phosphoric esters, alkylphosphoric ester, e.g., octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, isoeicosyl phosphate, and alkali metal salt of these alkylphosphoric esters, alkylsulfonic esters and alkali metal salt of alkylsulfonic esters, fluorine-containing alkylsulfuric esters and alkali metal salt thereof, monobasic fatty acid having from 10 to 24 carbon atoms (which may contain an unsaturated bond or may be branched), e.g., lauric acid, myristic acid, palmitic acid, stearic acid, behenic acid, butyl stearate, oleic acid, linoleic acid, linolenic acid, elaidic acid, erucic acid, and alkali metal salt of these monobasic fatty acids, fatty acid monoester, fatty acid diester or polyhydric fatty acid ester composed of monobasic fatty acid having from 10 to 24 carbon atoms (which may contain an unsaturated bond or may be branched), e.g., butyl stearate, octyl stearate, amyl stearate, isooctyl stearate, octyl myristate, butyl laurate, butoxyethyl stearate, anhydro-sorbitan monostearate, anhydrosorbitan tristearate, and any one of mono-, di-, tri-, tetra-, penta- or hexa-alcohols having from 2 to 22 carbon atoms (which may contain an unsaturated bond or may be branched), alkoxy alcohol having from 2 to 22 carbon atoms (which may contain an unsaturated bond or may be branched) and monoalkyl ether of alkylene oxide polymerized product, fatty acid amide having from 2 to 22 carbon atoms, and aliphatic amines having from 8 to 22 carbon atoms. Besides the above hydrocarbon groups, those having a nitro group, or an alkyl, aryl, or aralkyl group substituted with a group other than a hydrocarbon group, such as halogen-containing hydrocarbon, e.g., F, Cl, Br, $CF_3$, $CCl_3$, $CBr_3$, may be used.

In addition, nonionic surfactants, e.g., alkylene oxide, glycerol, glycidol, alkylphenol ethylene oxide adduct, etc., cationic surfactants, e.g., cyclic amine, ester amide, quaternary ammonium salts, hydantoin derivatives, heterocyclic rings, phosphoniums and sulfoniums, anionic surfactants containing an acid group, e.g., carboxylic acid, sulfonic acid or a sulfuric ester group, and amphoteric surfactants, e.g., aminoacids, aminosulfonic acids, sulfuric or phosphoric esters of amino alcohol, and alkylbetaine can also be used. The details of these surfactants are described in detail in *Kaimen Kasseizai Binran* (*Handbook of Surfactants*), Sangyo Tosho Publishing Co., Ltd.

These lubricants and antistatic agents need not be 100% pure and may contain impurities such as isomers, unreacted products, byproducts, decomposed products and oxides, in addition to the main components. However, the content of such impurities is preferably 30 mass % or less, and more preferably 10 mass % or less.

Additives that can be contained in a magnetic layer in the invention with the above binders and ferromagnetic powders are described.

Carbon Black:

Carbon blacks usable in a magnetic layer include furnace blacks for rubbers, thermal blacks for rubbers, carbon blacks for coloring, and acetylene blacks. Carbon blacks for use in the invention preferably have a specific surface area of from 5 to 500 m$^2$/g, a DBP oil absorption amount of from 10 to 400 ml/100 g, an average particle size of from 5 to 300 nm, a pH value of from 2 to 10, a moisture content of from 0.1 to 10%, and a tap density of from 0.1 to 1 g/ml. Specifically, carbon blacks disclosed in WO 98/35345 are exemplified.

Carbon blacks may be surface-treated with a dispersant, may be grafted with resins, or a part of the surface may be graphitized in advance before use. Carbon blacks may be previously dispersed in a binder before being added to a magnetic coating solution. Carbon blacks can be used alone or in combination. It is preferred to use carbon blacks in an amount of from 0.1 to 30 mass % based on the mass of the magnetic powder. Carbon blacks can serve various functions such as the prevention of the static charge and the reduction of the friction coefficient of a magnetic layer, the impartation of a light-shielding property to a magnetic layer, and the improvement of the film strength of a magnetic layer. Such functions vary by the kind of the carbon black to be used. Accordingly, when the invention takes a multilayer structure, it is of course possible to select and determine the kinds, amounts and combinations of carbon blacks to be added to each layer, on the basis of the above-described various properties such as the particle size, the oil absorption amount, the electrical conductance and the pH value, or it is rather preferred to be optimized in each layer.

Abrasive:

A magnetic layer may contain abrasives in the invention. As the abrasives usable in a magnetic layer, well-known materials essentially having a Mohs' hardness of 6 or more may be used alone or in combination, e.g., $\alpha$-alumina having an $\alpha$-conversion rate of 90% or more, $\beta$-alumina, silicon carbide, chromium oxide, cerium oxide, $\alpha$-iron oxide, corundum, artificial diamond, silicon nitride, silicon carbide, titanium carbide, titanium oxide, silicon dioxide, and boron nitride are exemplified. Composites composed of these abrasives (abrasives obtained by surface-treating with other abrasives) can also be used.

Compounds or elements other than the main component are often contained in abrasives in the invention, but the intended effect can be obtained so far as the content of the main component is 90% or more. Abrasives have an average particle size of preferably from 0.01 to 2 μm, and in particular for improving electromagnetic characteristics (S/N or C/N), abrasives having narrow particle size distribution are preferred. For improving durability, a plurality of abrasives each having a different particle size may be combined according to necessity, or a single abrasive having broad particle size distribution may be used so as to attain the same effect as such a combination.

Abrasives for use in the invention preferably have a tap density of from 0.3 to 2 g/ml, a moisture content of from 0.1 to 5%, a pH value of from 2 to 11, and a specific surface area of from 1 to 30 m$^2$/g. The shape of the abrasives to be used in the invention may be any of acicular, spherical and die-like shapes. Preferably, the abrasives have a shape partly with edges, because a high abrasive property can be obtained. Specifically, abrasives disclosed in WO 98/35345 are exemplified. When diamonds are used as disclosed in WO 98/35345, it is effective to improve running durability and electromagnetic characteristics. The particle sizes and the amounts of abrasives to be used in a magnetic layer and a nonmagnetic layer are of course set at optimal values.

Other Additives:

As other additives usable in a magnetic layer in the invention, those having a lubricating effect, an antistatic effect, a dispersing effect and a plasticizing effect are exemplified, and comprehensive improvement of performances can be contrived by combining these additives. As additives having a lubricating effect, lubricants giving a remarkable action on agglutination caused by the friction of surfaces of materials with each other are used. Lubricants are classified into two types. Lubricants that are used for a magnetic recording tape cannot be judged completely whether they show fluid lubrication or boundary lubrication, but according to general concept they are classified into higher fatty acid esters, liquid paraffin and silicon derivatives which show fluid lubrication, and long chain fatty acids, fluorine surfactants and fluorine-containing polymers which show boundary lubrication. In a coating type magnetic recording medium, lubricants exist in a state dissolved in a binder or in a state of partly being adsorbed onto the surface of ferromagnetic powder, and they migrate to the surface of a magnetic layer. The speed of migration depends upon whether the compatibility of a binder and a lubricant is good or bad. The speed of migration is slow when the compatibility of a binder and a lubricant is good and the migration speed is fast when the compatibility is bad. As one idea as to good or bad of the compatibility, there is a means of comparison of dissolution parameters of a binder and a lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication each having different characteristics in combination, and it is more preferred to combine at least three kinds of these lubricants. Solid lubricants can also be used in combination with these lubricants.

The examples of solid lubricants that can be used in combination include molybdenum disulfide, tungsten graphite disulfide, boron nitride, and graphite fluoride. The examples of long chain fatty acids showing boundary lubrication include monobasic fatty acids having from 10 to 24 carbon atoms (they may contain an unsaturated bond or may be branched) and metal salts of these monobasic fatty acids (e.g., with Li, Na, K or Cu). The examples of fluorine surfactants and fluorine-containing polymers include fluorine-containing silicones, fluorine-containing alcohols, fluorine-containing esters, fluorine-containing alkyl sulfates and alkali metal salts of these compounds. The examples of higher fatty acid esters showing fluid lubrication include fatty acid monoesters, fatty acid diesters and fatty acid triesters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), and fatty acid esters of monoalkyl ethers of alkylene oxide polymerized products. In addition to the above, the examples further include liquid paraffin, and as silicon derivatives, silicone oils, e.g., dialkylpolysiloxane (the alkyl group has from 1 to 5 carbon atoms), dialkoxypolysiloxane (the alkoxyl group has from 1 to 4 carbon atoms), monoalkyl-monoalkoxypolysiloxane (the alkyl group has from 1 to 5 carbon atoms and the alkoxyl group has from 1 to 4 carbon atoms), phenylpolysiloxane, and fluoroalkylpolysiloxane (the alkyl group has from 1 to 5 carbon atoms), silicones having a polar group, fatty acid-modified silicones, and fluorine-containing silicones.

The examples of other lubricants include alcohols, e.g., mono-, di-, tri-, tetra-, penta- and hexa-alcohols having from 12 to 22 carbon atoms (they may contain an unsaturated bond or may be branched), alkoxy alcohols having from 12 to 22 carbon atoms (they may contain an unsaturated bond or may be branched), and fluorine-containing alcohols, polyethylene waxes, polyolefins such as polypropylene, ethylene glycols, polyglycols such as polyethylene oxide waxes, alkyl phosphates and alkali metal salts of alkyl phosphates, alkyl sulfates and alkali metal salts of alkyl sulfates, polyphenyl ethers, fatty acid amides having from 8 to 22 carbon atoms, and aliphatic amines having from 8 to 22 carbon atoms.

Lubricants that are particularly preferably used in the invention are fatty acids and fatty acid esters, and the specific examples are disclosed in WO 98/35345. Besides the above, other different lubricants and additives can be used in combination as well.

Additionally, nonionic surfactants, e.g., alkylene oxides, glycerols, glycidols and alkylphenol-ethylene oxide adducts; cationic surfactants, e.g., cyclic amines, ester amides, quaternary ammonium salts, hydantoin derivatives, heterocyclic rings, phosphoniums and sulfoniums; anionic surfactants containing an acid group, such as carboxylic acid, sulfonic acid, phosphoric acid, a sulfuric ester group and a phosphoric ester group; and amphoteric surfactants, e.g., amino acids, aminosulfonic acids, sulfuric esters or phosphoric esters of amino alcohols, and alkylbetaines can also be used.

These surfactants are described in detail in *Kaimen Kasseizai Binran (Handbook of Surfactants)* (published by Sangyo Tosho Co., Ltd.). These lubricants and antistatic agents need not be 100% pure and may contain impurities such as isomers, unreacted products, byproducts, decomposed products and oxides, in addition to the main component. However, the content of impurities is preferably 30% or less, more preferably 10% or less.

As disclosed in WO 98/35345, it is also preferred to use a monoester and a diester in combination as fatty acid esters in the present invention.

Lubricants and surfactants for use in the invention individually have different physical functions. The kinds, amounts and combining proportions bringing about synergistic effects of these lubricants should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amount of the surfactant is controlled so as to improve the coating stability, or the amount of the lubricant in the intermediate layer is made larger so as to improve the lubricating effect. The examples are by no means limited thereto. In general, the total amount of lubricants is from 0.1 to 50 mass %, preferably from 2 to 25 mass %, based on 100 mass parts of the magnetic powder or the nonmagnetic powder.

All or a part of the additives to be used in the invention may be added to a magnetic coating solution or a nonmagnetic coating solution in any step of preparation. For example, additives may be blended with magnetic powder before a kneading step, may be added in a step of kneading magnetic powder, a binder and a solvent, may be added in a dispersing step, may be added after a dispersing step, or may be added just before coating. According to the purpose, there are cases of capable of attaining the object by coating all or a part of additives simultaneously with or successively after the coating of a magnetic layer. Further, according to purpose, a lubricant may be coated on the surface of a magnetic layer after calendering treatment or after completion of slitting.

Lower Layer

A magnetic recording tape in the invention may be a multilayer constitution comprising a magnetic layer and a nonmagnetic layer (a lower nonmagnetic layer) or a magnetic layer (a lower magnetic layer) under the magnetic layer, and inorganic powders for use in the lower layer may be magnetic powder or nonmagnetic powder.

When nonmagnetic powders are used in a lower layer in the invention, the nonmagnetic powders can be selected from inorganic compounds, e.g., metallic oxides, metallic carbonates, metallic sulfates, metallic nitrides, metallic carbides and metallic sulfides, and nonmagnetic metals. The examples of the inorganic compounds are selected from the following compounds and they can be used alone or in combination, e.g., titanium oxides ($TiO_2$, TiO), α-alumina having an α-conversion rate of from 90 to 100%, β-alumina, γ-alumina, α-iron oxide, chromium oxide, zinc oxide, tin oxide, tungsten oxide, vanadium oxide, silicon carbide, cerium oxide, corundum, silicon nitride, titanium carbide, silicon dioxide, magnesium oxide, zirconium oxide, boron nitride, calcium carbonate, calcium sulfate, barium sulfate, molybdenum disulfide, goethite, and aluminum hydroxide. Titanium dioxide, zinc oxide, iron oxide and barium sulfate are particularly preferred, and titanium dioxides disclosed in JP-A-5-182177, and α-iron oxides disclosed in JP-A-6-60362 and JP-A-9-170003 are further preferred. As the nonmagnetic metals, Cu, Ti, Zn and Al are exemplified. These nonmagnetic powders preferably have an average particle size of from 0.005 to 2 μm, but if necessary, nonmagnetic powders each having a different average particle size may be combined, or single nonmagnetic powder having broad particle size distribution may be used so as to obtain the same effect as such a combination. Particularly preferred nonmagnetic powders are those having an average particle size of from 0.01 to 0.2 μm. These nonmagnetic powders have a pH value of from 6 to 9, a specific surface area by a BET method ($S_{BET}$) of from 1 to 100 $m^2/g$, preferably from 5 to 50 $m^2/g$, and more preferably from 7 to 40 $m^2/g$, a crystallite size of from 0.01 to 2 μm, an oil absorption amount using DBP of from 5 to 100 ml/100 g, preferably from 10 to 80 ml/100 g, and more preferably from 20 to 60 ml/100 g, and a specific gravity of from 1 to 12, and preferably from 3 to 6. The shape of the nonmagnetic powders may be any of acicular, spherical, polyhedral and tabular forms.

As soft magnetic powders, granular Fe and Ni, granular magnetite, Fe—Si, Fe—Al, Fe—Ni, Fe—Co, Fe—Co—Ni, Fe—Al—Co (Sendust) alloys, Mn—Zn ferrite, Ni—Zn ferrite, Mg—Zn ferrite, Mg—Mn ferrite, and other soft magnetic powders described in Fusanobu Chikazumi, *Kyojiseitai no Butsuri (Ge), Jiki Tokusei to Oyo (Physics of Ferromagnetic Powders (the lower volume), Magnetic Characteristics and Applications)*, pp. 368 to 376, published by Shokabo (1984) are exemplified. It is preferred that at least a part of the surfaces of these nonmagnetic powders and soft magnetic powders is subjected to surface treatment to be covered with $Al_2O_3$, $SiO_2$, $TiO_2$, $ZrO_2$, $SnO_2$ $Sb_2O_3$, or ZnO. Of these compounds for surface treatment, $Al_2O_3$, SiO2, $TiO_2$ and $ZrO_2$ are particularly preferred forgiving good dispersibility, and $Al_2O_3$, $SiO_2$ and $ZrO_2$ are still more preferred. These compounds may be used in combination or alone. According to purpose, a layer subjected to surface treatment by coprecipitation may be used. Alternatively, surfaces of particles may be covered with alumina previously, and then the alumina-covered surface may be covered with silica, or vice versa, according to purposes. A surface-covered layer may be a porous layer, if necessary, but a homogeneous and dense surface is generally preferred.

By incorporating carbon blacks into these lower layers, surface electrical resistance (Rs) can be reduced and a desired micro Vickers hardness can be obtained. The average primary particle size of carbon blacks is generally from 5 to 80 nm, preferably from 10 to 50 nm, and more preferably from 10 to 40 nm. Specifically, the carbon blacks that can be used in the later-described back coat layer can be used in lower layers.

In the lower layers in the invention, magnetic powders can also be used as inorganic powders. As magnetic powders, $\gamma$-$Fe_2O_3$, Co-modified $\gamma$-$Fe_2O_3$, alloys comprising $\alpha$-Fe as the main component, and $CrO_2$ can be used. The magnetic powders in the lower layers can be selected according to purposes, and the effect of the invention does not depend upon the kinds of magnetic powders. However, performance may be varied in upper and lower layers according to purpose as is well known. For example, for the improvement of long wavelength recording characteristics, it is preferred to set Hc of a lower magnetic layer lower than that of an upper magnetic layer, and it is also effective to make Br of a lower magnetic layer higher than that of an upper magnetic layer. In addition, the advantages of well-known multilayer structures can be utilized.

The binders, lubricants, dispersants, additives, solvents, dispersing methods and others used in the above described magnetic layers can be used in lower layers. In particular, with respect to the amounts and kinds of binders, and the amounts and kinds of additives and dispersants, well-known techniques used in magnetic layers can be applied to lower layers.

Back Coat Layer

A magnetic recording tape in the invention has a back coat layer on the side of a flexible support opposite to the side having a magnetic layer.

Nonmagnetic powder dispersed in a binder is used in the back coat layer of a magnetic recording tape in the invention. The surface of the back coat layer has protrusions having a height of 100 nm or more measured with an atomic force microscope (AFM) in the density of from 10 to 500 in 90 μm square, preferably from 20 to 300, more preferably from 20 to 200, and the ratio of the total number of the protrusions having a height of 50 nm or more (P50) and the total number of the protrusions having a height of 100 nm or more (P100), (P50/P100), is from 10 to 100, preferably from 20 to 80. The distribution of protrusion density can be controlled by the particle size and the state of dispersion of the filler contained in a back coat layer, the protrusions on the surface of the support, and the thickness of the back coat layer. When more than 500 protrusions are present in 90 μm square, S/N (C/N) lowers by imprinting of back coat. On the other hand, when the number of protrusions is less than 10, the back coat layer becomes too smooth, which leads to the increase of friction and dropout. By making P50/P100 between 10 and 100, good S/N (C/N) and running durability can be achieved.

As the nonmagnetic powders for use in a back coat layer, carbon blacks, metallic fine powders, organic fillers and metallic oxides are exemplified. Carbon blacks and metallic oxides are preferred for chemical stability and excellent dispersibility, and they may be used as admixture. As metallic oxides, titanium oxide, $\alpha$-iron oxide, goethite, $SiO_2$, $SnO_2$, $WO_3$, $Al_2O_3$, $ZrO_2$ and ZnO are exemplified. In the case of granular particles, a particle size is preferably from 5 to 100 nm, more preferably from 10 to 70 nm. In the case of acicular particles, a long axis length is generally from 0.05 to 0.5 μm, preferably from 0.05 to 0.4 μm, and more preferably from 0.07 to 0.3 μm. In the case of tabular particles, the longest tabular diameter is generally from 0.05 to 2 μm on average, preferably from 0.05 to 1 μm.

Carbon blacks having an average primary particle size of generally 50 nm or less, preferably from 10 to 40 nm, can be used in a back coat layer for the purpose of imparting electric conductivity. When carbon black is used as admixture with metallic oxide, the ratio of metallic oxide/carbon black by weight is generally from 60/40 to 90/10, preferably from 70/30 to 90/10. When the particle size of carbon black exceeds 50 nm, the structure does not grow, so that electric resistance does not lower. While when the particle size is smaller than 10 nm, agglomeration of particles increases and protrusions are formed on the back coat surface, as a result imprinting of back coat becomes conspicuous.

Further, for the purpose of obtaining the protrusion density prescribed in the invention and giving the function as a solid lubricant, it is preferred to use carbon black having an average primary particle size of 80 nm or more in a back coat layer. The addition amount of the carbon black is from 0.1 to 30 parts per 100 parts of the sum total of the metallic oxides or the carbon black having an average primary particle size of 50 nm or less, preferably from 0.3 to 20 parts, and more preferably from 0.5 to 25 parts. When too much amount of the carbon black is added, the protrusions on the surface of the back coat layer increase, and imprinting of back coat becomes conspicuous. While when the amount is too little, desired protrusion density cannot be obtained.

Carbon blacks preferably have pH of from 2 to 10, a moisture content of from 0.1 to 10%, and a tap density of from 0.1 to 1 g/ml. The specific surface area ($S_{BET}$) of carbon blacks having a particle size of 50 nm or less is from 100 to 500 $m^2$/g, preferably from 150 to 400 $m^2$/g, a DBP oil absorption amount is from 20 to 400 ml/100 g, preferably from 30 to 200 ml/100 g. The specific surface area ($S_{BET}$) of carbon blacks having a particle size of 80 nm or less is from 5 to 100 $m^2$/g, preferably from 5 to 30 $m^2$/g, a DBP oil absorption amount is from 20 to 120 ml/100 g, preferably from 30 to 110 ml/100 g.

As the binder for a back coat layer in the invention, well-known thermoplastic resins, thermosetting resins and reactive resins can be used. The examples of preferred binders include cellulose resins not containing chlorine, e.g., nitrocellulose, phenoxy resins and polyurethane resins. Of these resins, polyurethane resins having a Tg of from 80 to 140° C. are more preferably used for improving storage property. Further, it is preferred for a back coat layer to contain abrasive particles having a Mohs' hardness of 9 or more and an average primary particle size of from 10 to 40% of the thickness of the back coat layer for capable of further improving running durability. As such abrasive particles, $\alpha$-alumina, chromium oxide, artificial diamond, and carbonic boron nitride (CBN) can be exemplified. Above all, it is preferred to use abrasive particles having an average particle size of 0.3 μm or less and a particle size of from 10 to 40% of the back coat layer thickness. When the particle size is smaller than 10% of the back coat layer thickness, the abrasive particles are buried in the back coat layer and cannot function as abrasive, while when the particle size exceeds 40%, protrusions increase and imprinting of back coat increases.

Flexible Support

Flexible supports for use in the invention are nonmagnetic supports, e.g., biaxially stretched polyethylene naphthalate and polyethylene terephthalate can be used. Polyesters comprising dicarboxylic acid and diol, e.g., polyethylene terephthalate and polyethylene naphthalate are preferably used.

As the dicarboxylic acid component of the main constitutional components, terephthalic acid, isophthalic acid, phthalic acid, 2,6-naphthalenedicarboxylic acid, 2,7-naphthalenedicarboxylic acid, diphenyl sulfone dicarboxylic acid, diphenyl ether dicarboxylic acid, diphenylethane-dicarboxylic acid, cyclohexanedicarboxylic acid, diphenyldicarboxylic acid, diphenyl thioether dicarboxylic acid, diphenyl ketone dicarboxylic acid, and phenylindane-dicarboxylic acid can be exemplified.

As the diol component, ethylene glycol, propylene glycol, tetramethylene glycol, cyclohexanedimethanol, 2,2-bis(4-hydroxyphenyl)propane, 2,2-bis(4-hydroxyethoxyphenyl)-propane, bis(4-hydroxyphenyl)sulfone, bisphenol fluorene dihydroxy ethyl ether, diethylene glycol, neopentyl glycol, hydroquinone, and cyclohexanediol can be exemplified.

Of polyesters comprising these dicarboxylic acids and diols as main constitutional components, from the points of transparency, mechanical strength and dimensional stability, polyesters mainly comprising terephthalic acid and/or 2,6-naphthalenedicarboxylic acid as the dicarboxylic acid components, and ethylene glycol and/or 1,4-cyclohexane-dimethanol as the diol components are preferred.

Of these polyesters, polyesters mainly comprising polyethylene terephthalate or polyethylene-2,6-naphthalate, polyesters copolymers comprising terephthalic acid, 2,6-naphthalenedicarboxylic acid and ethylene glycol, and polyesters mainly comprising mixtures of two or more of these polyesters are preferred. Polyesters mainly comprising polyethylene-2,6-naphthalate are particularly preferred.

Polyesters constituting the biaxially stretched polyester films in the invention may be copolymerized with other copolymer components or mixed with other polyesters so long as they do not hinder the effect of the invention. As the examples thereof, the aforementioned dicarboxylic acid components, diol components, and polyesters comprising these components are exemplified.

For the purpose of being hard to cause delamination when formed as a film, polyesters for use in the invention may be copolymerized with aromatic dicarboxylic acids having a sulfonate group or ester-formable derivatives of them, dicarboxylic acids having a polyoxyalkylene group or ester formable derivatives of them, or diols having a polyoxyalkylene group.

Of these compounds, from the points of polymerization reactivity of polyesters and transparency of films, sodium 5-sulfoisophthalate, sodium 2-sulfoterephthalate, sodium 4-sulfophthalate, sodium 4-sulfo-2,6-naphthalene-dicarboxylate, compounds obtained by substituting the sodium of the above compounds with other metals (e.g., potassium, lithium, etc.), ammonium salt or phosphonium salt, or ester formable derivatives of them, polyethylene glycol, polytetramethylene glycol, polyethylene glycol-polypropylene glycol copolymers, and compounds obtained by oxidizing both terminal hydroxyl groups of these compounds to make carboxyl groups are preferably used. The proportion of the copolymerization of these compounds for this purpose is preferably from 0.1 to 10 mol % on the basis of the amount of the dicarboxylic acids constituting the polyesters.

For improving heat resistance, bisphenol compounds, and compounds having a naphthalene ring or a cyclohexane ring can be copolymerized with polyesters. The proportion of the copolymerization of these compounds is preferably from 1 to 20 mol % on the basis of the amount of the dicarboxylic acids constituting the polyesters.

The synthesizing method of the polyesters in the invention is not particularly restricted, and well-known manufacturing methods of polyesters can be used. For example, a direct esterification method of directly esterification reacting dicarboxylic acid component and diol component, and an ester exchange method of performing ester exchange reaction of dialkyl ester as the dicarboxylic acid component and diol component in the first place, which is then polymerized by heating under reduced pressure to remove the excessive diol component can be used. At this time, if necessary, an ester exchange catalyst, a polymerization reaction catalyst or a heat resistive stabilizer can be added.

Further, one or two or more kinds of various additives, such as a coloring inhibitor, an antioxidant, a crystal nucleus agent, a sliding agent, a stabilizer, a blocking preventive, an ultraviolet absorber, a viscosity controller, a defoaming and clarifying agent, an antistatic agent, a pH adjustor, a dye, and a pigment may be added in each process of synthesis.

The intrinsic viscosity of polyester measured by using a mixed solvent of phenol/1,1,2,2-tetrachloroethane is from 0.40 to 0.60 dl/g, preferably from 0.43 to 0.57 dl/g, and more preferably from 0.45 to 0.55 dl/g.

The intrinsic viscosity used in the invention means the intrinsic viscosity of the polymers at large constituting a flexible support, which is obtained by dissolving a flexible support (excluding insoluble solids content, e.g., powder) in a mixed solvent comprising phenol/1,1,2,2-tetrachloroethane (60/40 by mass), taking the concentration of the solution as the axis of abscissa and the relative viscosity corresponding to the solution as the axis of ordinate measured at 25° C. by Ubbelohde's viscometer, plotting the measured data and extrapolating the point of zero of concentration. When the intrinsic viscosity is less than 0.4, the polymerization degree is low, so that a film-forming property and the strength of a film are not improved, and when it is greater than 0.6, projection and burr of the base of a slit edge become large in a slitting process, and weaving of this part is liable to occur in running.

Further, the number average molecular weight (Mn) of the polyesters in the invention according to GPC (gel permeation chromatography) (calculated in terms of PMMA) is from 12,000 to 24,000, preferably from 1,400 to 22,000.

The polyesters for use in the invention can be obtained by synthesizing methods as described above, and by controlling the molecular weight in synthesizing process, polyesters having desired molecular weight and viscosity can be obtained. The controlling method is not particularly restricted and, for example, adding a reaction stopper in the reaction when desired molecular weight is reached can be exemplified.

Polyester films in the invention have a Young's modulus in the machine direction of preferably from 7.0 to 8.6 GPa, in the transverse direction of from 5.4 to 8.0 GPa. When the Young's modulus in the machine direction of a polyester film exceeds 8.6 GPa, there are cases where head touch fails. While when the Young's modulus in the transverse direction is less than 5.4 GPa, the strength of the magnetic tape in the transverse direction is insufficient, so that the tape is liable to be folded by a guide pin for regulating tape pass in running, which is not preferred.

The polyester film in the invention preferably has the surface roughness SRa (A) of the surface on the side having a magnetic layer (side A) of 1.0 nm or more and less than 6.0 nm, more preferably from 1.5 to 5.5 nm. The surface roughness is a value obtained by measurement with a tracer system three dimensional surface roughness meter. If SRa (A) is less than 1.0 nm, running durability is insufficient when the film is used as a magnetic tape. On the other hand, if it is 6 nm or more, the output and S/N (C/N) are insufficient when the film is used as a magnetic tape.

The surface roughness SRb (B) on the opposite side to side having a magnetic layer of the polyester film (side B) by the tracer system three dimensional surface roughness meter is preferably 6.0 nm or more and less than 10.0 nm, more preferably from 6.5 to 9.0 nm. When SRb (B) is less than 6.0 nm, the friction coefficient increases and the handling property is deteriorated, while when SRb (B) is greater than the upper limit, the back imprinting of the roughness of side B on side A or the transfer of configuration occurs to thereby roughen side A when the film is wound round a reel.

It is preferred that side A of the polyester film having a magnetic layer in the invention contains fine particles having an average particle size of from 30 to 150 nm, preferably from 40 to 100 nm, in proportion of 0.1 wt % or less, preferably 0.06 wt % or less. From the point of the durability of a magnetic layer, it is preferred to contain the fine particles. As such fine particles, silica, calcium carbonate, alumina, polyacrylic particles and polystyrene particles can be preferably used.

It is preferred that the side opposite to the side having a magnetic layer (side B) of the polyester film is rougher than the side having a magnetic layer (side A) in view of the film forming process of a flexible support, the manufacturing process of a magnetic recording tape and the running stability of a tape.

The methods of making side B rougher than side A are not particularly limited, but a method of laminating two kinds of polyester films different in the kinds, the average particle sizes and/or the addition amounts of fine particles is preferred. As the method of laminating the layers of polyester films, a co-extrusion process is preferably used. At that time, the thickness of the layer of the polyester film forming side B is preferably from ½ to ¹⁄₁₀ of the thickness of the entire film. As the fine particles used in the layer of the polyester film forming side B, calcium carbonate, silica, alumina, polystyrene particles and silicone resin particles are exemplified. The average particle size of these fine particles is preferably from 80 to 800 nm, more preferably from 100 to 700 nm, and the addition amount is preferably from 0.05 to 1.0 wt % to the polyester forming side B, more preferably from 0.08 to 0.8 wt %.

Polyester films for use in the invention can be manufactured according to conventionally well-known methods. For example, the polyester for forming side A and the polyester for forming side B are laminated in a die by using a well-known extruder, the laminated polyester is extruded from a nozzle in the form of a sheet at temperature of from a melting point (Tm) to (Tm+70° C.), and then the extruded polyester is suddenly cooled and set at from 40 to 90° C., whereby a laminated unstretched film is obtained. After that, the unstretched film is stretched by an ordinary method in a uniaxial direction by 2.5 to 4.5 times, preferably from 2.8 to 3.9 times, at temperatures around (glass transition temperature (Tg)−10° C.) to (Tg+70° C.), and then in the right angle direction to the former direction by 4.5 to 8.0 times, preferably from 4.5 to 6.0 times, at temperatures around Tg to (Tg+70° C.), and further if necessary, again in the machine direction and/or transverse direction, whereby a biaxially oriented film is obtained. That is, it is preferred to perform stretching of two stages, three stages, four stages, or multistages. The total stretch magnification is generally 12 times or more in terms of area stretch magnification, preferably from 12 to 32 times, more preferably from 14 to 26 times. The biaxially oriented film is given excellent dimensional stability by subsequent heat fixation crystallization at temperature of from (Tg+70° C.) to (Tm−10° C.), e.g., from 180 to 250° C. The time of heat fixation is preferably from 1 to 60 seconds. It is preferred to adjust a thermal shrinkage factor in the heat fixation treatment by relaxing the film by 3.0% or less, preferably from 0.5 to 2.0%, in the machine direction and/or transverse direction.

Manufacturing Method

A magnetic recording tape in the invention can be manufactured by, e.g., depositing or coating a coating solution on the surface of a flexible support under running so that the layer thickness after drying comes into the prescribed range. A plurality of magnetic or nonmagnetic coating solutions may be multilayer-coated sequentially or simultaneously. Air doctor coating, blade coating, rod coating, extrusion coating, air knife coating, squeeze coating, immersion coating, reverse roll coating, transfer roll coating, gravure coating, kiss coating, cast coating, spray coating and spin coating can be used for coating a magnetic coating solution. Regarding these methods, e.g., *Saishin Coating Gijutsu* (*The Latest Coating Techniques*), Sogo Gijutsu Center (May 31, 1983) can be referred to. When a magnetic recording tape having two or more layers on one side of a support is manufactured, e.g., the following methods can be used.

(1) A method of coating a lower layer in the first place by using any of gravure coating, roll coating, blade coating, and extrusion coating apparatus, which are ordinarily used in the coating of a magnetic coating solution, and then coating an upper layer while the lower layer is still wet by means of a support-pressing type extrusion coating apparatus as disclosed in JP-B-1-46186 (the term "JP-B" as used herein means an "examined Japanese patent publication"), JP-A-60-238179 and JP-A-2-265672.

(2) A method of coating an upper layer and a lower layer almost simultaneously by using a coating head equipped with two slits for feeding coating solutions as disclosed in JP-A-63-88080, JP-A-2-17971 and JP-A-2-265672.

(3) A method of coating an upper layer and a lower layer almost simultaneously by using an extrusion coating apparatus equipped with a backup roll as disclosed in JP-A-2-174965.

A coated magnetic layer is dried after the ferromagnetic powder contained in the magnetic layer has been subjected to magnetic field orientation treatment. The magnetic field orientation treatment can be performed at one's discretion by well-known methods. After drying, the magnetic layer is subjected to surface smoothing treatment by, e.g., super calender rollers. The voids generated by the removal of the solvent by drying disappear by the surface smoothing treatment and the packing rate of the ferromagnetic powder in the magnetic layer increases. As a result, a magnetic recording tape having high electromagnetic characteristics can be obtained. As the rollers for calendering treatment, heat resistive plastic rollers, e.g., epoxy, polyimide, polyamide and polyamideimide are used. Metal rollers may also be used for the treatment.

It is preferred for a magnetic recording tape in the invention to have good surface smoothness. For obtaining good smoothness, it is effective that a magnetic layer formed by selecting the foregoing specific binder is subjected to the calendering treatment. The calendering treatment is carried out at the temperature of calender rollers of from 60 to 100° C., preferably from 70 to 100° C., and particularly preferably from 80 to 100° C., and at the pressure of from 100 to 500 kg/cm, preferably from 200 to 450 kg/cm, and particularly preferably from 300 to 400 kg/cm. The thus-obtained magnetic recording tape is cut to a desired size with a cutter and the like before use. A magnetic recording tape having been subjected to calendering treatment is generally heat-treated. In recent years, reducing a thermal shrinkage factor is regarded as important for the linearity (the security of off track margin) of a high density magnetic recording tape. In particular, with the tendency of narrowing of track width, it is required to reduce a heat shrink factor in the MD direction (machine direction) under working environment to 0.07% or less. For reducing a thermal shrinkage factor, there are a method of performing heat treatment of a magnetic recording medium in a web state while handling under low tension, and a method of performing heat treatment of a tape as a pile, e.g., in a bulk state or a state of being encased in a cassette (a thermo treatment method). When the former method is used, the risk of back imprinting is little but a thermal shrinkage factor cannot be greatly reduced. Although there are some variations according to annealing temperature, staying time, the thickness of a tape and handling tension, the reduction of from 0.1 to 0.12% in a thermal shrinkage factor after 48 hours at 70° C. is limitative. The latter thermo treatment method can greatly improve a thermal shrinkage factor, but a magnetic layer is considerably infected with the unevenness of a back coat layer, by which the magnetic layer is roughened, as a result output reduction and noise increase are caused.

Physical Characteristics

The saturation magnetic flux density of the magnetic layer of a magnetic recording tape for use in the invention is preferably from 100 to 300 mT. The coercive force (Hr) of a magnetic layer is preferably from 143.3 to 318.4 kA/m (from 1,800 to 4,000 Oe), more preferably from 159.2 to 278.6 kA/m (from 2,000 to 3,500 Oe). The coercive force distribution is preferably narrow, and SFD and SFDr is preferably 0.6 or less, more preferably 0.2 or less.

A magnetic recording tape for use in the invention has a friction coefficient against a head at temperature of $-10°$ C. to 40° C. and humidity of 0% to 95% of 0.5 or less, preferably 0.3 or less, surface intrinsic viscosity of a magnetic surface of preferably from $10^4$ to $10^{12}$ Ω/sq, and a charge potential of preferably from $-500$ V to $+500$ V. The elastic modulus at 0.5% elongation of a magnetic layer is preferably from 0.98 to 19.6 GPa (from 100 to 2,000 kg/mm$^2$) in every direction of in-plane, breaking strength is preferably from 98 to 686 MPa (from 10 to 70 kg/mm$^2$), the elastic modulus of a magnetic recording tape is preferably from 0.98 to 14.7 GPa (from 100 to 1,500 kg/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less.

The glass transition temperature of a magnetic layer (the maximum point of the loss elastic modulus by dynamic viscoelasticity measurement at 110 Hz) is preferably from 50 to 180° C., and that of a nonmagnetic layer is preferably from 0 to 180° C. The loss elastic modulus is preferably in the range of from $1 \times 10^7$ to $8 \times 10^8$ Pa ($1 \times 10^8$ to $8 \times 10^9$ dyne/cm$^2$), and loss tangent is preferably 0.2 or less. When loss tangent is too large, adhesion failure is liable to occur. These thermal and mechanical characteristics are preferably almost equal in every direction of in-plane of the medium with the difference of not greater than 10%.

The residual amount of a solvent contained in a magnetic layer is preferably 100 mg/m$^2$ or less, more preferably 10 mg/m$^2$ or less. The void ratio of a coated layer is preferably 30% by volume or less, more preferably 20% by volume or less, with both of a nonmagnetic layer and a magnetic layer. The void ratio is preferably smaller for obtaining high output but in some cases a specific value should be preferably secured depending upon purposes. For example, in a disc medium that is repeatedly used, a large void ratio contributes to good running durability in many cases.

A magnetic layer preferably has a maximum height ($SR_{max}$) of 0.5 μm or less, a ten point average roughness (SRz) of 0.3 μm or less, a central plane peak height (SRp) of 0.3 μm or less, a central plane valley depth (SRv) of 0.3 μm or less, a central plane area factor (SSr) of from 20 to 80%, and an average wavelength (SλA) of from 5 to 300 μm. These can be easily controlled by the control of the surface property of a flexible support with fillers or by the surface configurations of the rolls of calender treatment. Curling is preferably within ±3 mm.

When a magnetic recording tape of the invention comprises a nonmagnetic layer and a magnetic layer, these physical characteristics can be varied according to purposes in a nonmagnetic layer and a magnetic layer. For example, running durability can be improved by making the elastic modulus of the magnetic layer higher and at the same time the head touching of the magnetic recording tape can be improved by making the elastic modulus of the nonmagnetic layer lower than that of the magnetic layer.

EXAMPLES

The invention will be described more specifically with referring to examples. The components, ratios, operations and orders described herein can be changed without departing from the spirit and scope of the invention, and these are not limited to the following examples. In the examples "parts" means "mass parts" unless otherwise indicated.

Manufacture of Magnetic Recording Tape:

The following magnetic recording tape was manufactured according to the method shown below.

1. Composition of Lower Layer Coating Solution

| | |
|---|---|
| Nonmagnetic powder, α-Fe$_2$O$_3$ | 80 parts |
| Average long axis length: 0.15 μm | |
| Acicular ratio: 8.5 | |
| Specific surface area (S$_{BET}$): 56 m$^2$/g | |
| pH: 8 | |
| Fe$_2$O$_3$ content: 90% or more | |
| DBP oil absorption amount: from 27 to 38 ml/100 g | |
| Surface treating compound: Al$_2$O$_3$ | |
| Carbon black | 20 parts |
| Average primary particle size: 16 nm | |
| DBP oil absorption amount: 80 ml/100 g | |
| pH: 8.0 | |
| Specific surface area (S$_{BET}$): 25 m$^2$/g | |
| Volatile content: 1.5% | |
| Vinyl chloride copolymer | 10 parts |
| SO$_3$K, containing epoxy group | |
| Average polymerization degree: 310 | |
| Polyester-polyurethane resin | 5 parts |
| Molecular weight: 35,000 | |
| Neopentyl glycol/caprolactone polyol/MDI = 0.9/2.6/1 | |
| (MDI: methylene diisocyanate) | |
| —SO3Na group content: $1 \times 10^{-4}$ eq/g | |
| Butyl stearate | 1 part |
| Stearic acid | 1 part |
| Methyl ethyl ketone | 100 parts |
| Cyclohexanone | 50 parts |
| Toluene | 50 parts |

2. Composition of Magnetic Layer Coating Solution

| | |
|---|---|
| Ferromagnetic metal fine particles | 100 parts |
| Composition: FE/Co = 75/25 | |
| Hc: 2,400 Oe | |
| Specific surface area($S_{BET}$): 58 m$^2$/g | |
| Crystallite size: 120 Å | |
| Surface treating copounds: $Al_2O_3$ | |
| particle sixze (Ion axis length): 0.045 μm | |
| Acicular ratio: 4.5 | |
| $\sigma_s$: 112 emu/g | |
| Vinyl chloride copolymer | 5 parts |
| $SO_3K$, containing epoxy group | |
| Average polymerization degree: 310 | |
| Polyester-polyurethane resin | 3 parts |
| Neopentyl glycol/caprolactone polyol/MDI = 0.9/2.6/1 | |
| —SO3Na group content: 1 × 10$^{-4}$ eq/g | |
| α-Alumina (particle size: 0.1 μm) | 5 parts |
| Carbon black (particle size: 0.10 μm) | 0.5 parts |
| Butyl stearate | 1.5 parts |
| Stearic acid | 0.5 parts |
| Methyl ethyl ketone | 90 parts |
| Cyclohexanone | 30 parts |
| Toluene | 60 parts |

With each of the above coating solutions, components were kneaded in a kneader and then dispersed in a sand mill. Polyisocyanate was added in an amount of 3 parts to the dispersion of the lower layer coating solution and 1 part to the dispersion of the upper magnetic layer coating solution. Further, 40 parts of a mixed solvent of methyl ethyl ketone and cyclohexanone was added to each solution, and each solution was filtered through a filter having an average pore diameter of 1 μm to obtain coating solutions for forming a lower layer and an upper magnetic layer. The obtained lower layer coating solution was coated in a dry thickness of 1.2 μm on a polyethylene naphthalate support having a thickness of 5.5 μm, an intrinsic viscosity of 0.50 dl/g, and a number average molecular weight of 18,000, and immediately after that the magnetic layer coating solution was coated in a dry thickness of 0.1 μm by simultaneous multilayer-coating. The support comprises two layers having an SRa on the magnetic layer side of 2.4 nm and an SRb on the back coat layer side of 7.3 nm. The coated layers were subjected to orientation with a cobalt magnet having a magnetic force of 3,000 G and a solenoid having a magnetic force of 1,500 G while both layers were still wet, and they drying. Subsequently, a back coat layer coating solution having the composition shown below was coated in a dry thickness of 0.5 μm. After drying, the sample was subjected to treatment with a calender comprising metal rolls alone at 90° C. The obtained web was slit to a width of ½ inch, whereby a magnetic tape was obtained.

3. Composition of Back Coat Layer Coating Solution

Kneading Substance (1):

| | |
|---|---|
| Carbon black A (particle size: 40 nm) | 100 parts |
| Nitrocellulose (RS ½) | 50 parts |
| Polyurethane resin | 40 parts |
| (glass transition temperature: 50° C.) | |
| Dispersants | |
| Copper oleate | 5 parts |
| Copper phthalocyanine | 5 parts |
| Precipitating barium sulfate | 5 parts |
| Methyl ethyl ketone | 500 parts |
| Toluene | 500 parts |

Kneading Substance (2):

| | |
|---|---|
| Carbon black B | 10 parts |
| Specific surface area ($S_{BET}$): 8.5 m$^2$/g | |
| pH: 10 | |
| Average primary particle size: 100 nm | |
| DBP oil absorption amount: 36 ml/100 g | |
| Nitrocellulose (RS ½) | 40 parts |
| Polyurethane resin | 10 parts |
| Methyl ethyl ketone | 300 parts |
| Toluene | 300 parts |

Kneading substance (1) was preliminarily kneaded by a roll mill, and then (1) and (2) were blended in the proportion of 10 parts of carbon black B to 100 parts of carbon black A in Example 1. The blended product was dispersed by a sand grinder, and after completion of dispersion, 5 parts of polyester resin and 5 parts of polyisocyanate were respectively added to the dispersion.

Testing Method:

Measurement of Intrinsic Viscosity of Support:

Each polyester film was dissolved in a mixed solvent of phenol/1,1,2,2-tetrachloroethane (60/40 by weight), and intrinsic viscosity was measured at 25° C. with an automatic viscometer mounting Ubbelohde's viscometer.

Measurement of Number Average Molecular Weight of Support:

The number average molecular weight was found from the analytical curve formed by dissolving a polyester film in hexafluoroisopropanol (HFIP), with GPC HLC-8220 (constitution of column: comprising two Super HM-M, the temperature of the column bath: 40° C., manufactured by TOSOH CORPORATION), also using HFIP as the eluate, and polymethyl methacrylate (PMMA) whose molecular weight is already known.

Measurement of Protrusion Density of Back Coat Layer Surface:

The heights and the number of protrusions in 90 μm square were measured with an atomic force microscope by a tapping mode. The protrusion height was defined as the height with the central plane (a plane where the volume enclosed by the plane and the roughness curve is equal and smallest on the upper and lower sides of the plane) as the reference plane.

Measurement of Surface Roughness SRa and SRb of Support:

SRa and SRb were measured with a tracer system roughness meter (manufactured by Kosaka Laboratory, Ltd.) according to JIS B 0601.

Measurement of C/N Ratio:

Measurement was performed by attaching to a drum tester a recording head (MIG, gap: 0.15 μm, a track width: 18 μm, 1.8 T) and an MR head for reproduction (a shield type head, gap length between shields: 0.2 μm, a track width: 4 μm). Single frequency signals of recording wavelength of 0.2 μm (50 MHz) were recorded at relative speed of head-medium of 10 m/min, and the reproduced signals were analyzed by frequency with a spectrum analyzer (a product manufactured by Shiba Soku Co., Ltd.), and the ratio of the output voltage of the above single frequency signals to the noise voltage 0.5 MHz apart was taken as a C/N ratio. Bias current was applied to the MR head at reproducing time so that the reproduction output became the maximum.

After storing the tape wound on a reel at 60° C. 90% RH for one week, storage characteristic was measured by the above measuring method. C/N is preferably 50 dB or more before and after storage respectively.

Measurement of Dropout Increase:

A tape with a length of 600 m was wound up on a cartridge of LTO Ultrium-1 and signals of 100 kfci were recorded on the full length at a carrying rate of 5 m/sec with the same drive (manufactured by IBM Japan, Ltd.), and the increased number of dropouts were measured all over the length after going and returning of 10,000 times under the environment of 35° C. 85% RH (residual output: 25%), and the average number of dropouts per 1 m was computed. The increased number of dropout is preferably 1.5 or less.

TABLE 1

| Constitutional Element | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| Support | Intrinsic viscosity (dl/g) | 0.50 | 0.43 | 0.57 | 0.50 | 0.62 | 0.62 | 0.38 | 0.38 |
|  | Mn × $10^{-4}$ | 1.8 | 1.3 | 2.2 | 1.8 | 2.6 | 2.6 | 1 | 1 |
|  | Layer constitution | 2 | 2 |  | Mono-layer | Mono-layer | 2 | 2 | 2 |
|  | SRa (nm) | 2.4 | 5.2 | 1.5 | 5.3 | 6.7 | 0.8 | 0.8 | 6.8 |
|  | SRb (nm) | 7.3 | 9.2 | 6.3 | 6.5 | 7.8 | 11 | 3.6 | 11 |
| Back coat layer | P100/90 μm² | 200 | 430 | 16 | 25 | 600 | 7 | 7 | 670 |
|  | P50/90 μm² | 3,500 | 4,500 | 1,500 | 1,800 | 3,700 | 5,500 | 900 | 5,400 |
|  | P50/P100 | 17.5 | 10.5 | 93.8 | 72 | 6.17 | 786 | 129 | 8.06 |
| C/N | Before storage | 56.5 | 54.5 | 58 | 52.6 | 48.7 | 58.9 | 58.9 | 49 |
|  | After storage | 54.8 | 51.8 | 56 | 49.3 | 42.1 | 49.6 | 57.8 | 43.2 |
| Number of dropout increased | | 0.24 | 0.39 | 0.65 | 0.7 | 0.89 | 4.3 | 100 | 15 |

The protrusion density of the back coat layer was controlled by the blending amount of carbon black B. In Example 2, 15 parts of carbon black B, and in Examples 3 and 4, 5 parts of carbon black B were respectively added.

The magnetic recording tapes manufactured in Examples 1 to 3 were excellent in the C/N ratio and the increased numbers of dropouts were low. On the other hand, in Example 4, where a monolayer support was used, the C/N ratio was inferior as compared with those in Examples 1 to 3 and the value after storage was lower than the target value of 50 dB.

In Comparative Example 1, a monolayer support having large viscosity and high molecular weight and rough surface was used. The same back coat layer as used in Example 1 was used but the thickness was as thin as 0.2 μm. The C/N ratios were low both before and after storage due to back imprinting. Although friction was low, the burr of the tape edge was large due to high molecular weight, so that the increased number of dropouts was high.

In Comparative Example 2, the support was a multilayer support having a high molecular weight and the surface on the magnetic layer side was made smooth, and P50 on the back coat layer side was made small by increasing the amount of filler. Further, carbon black B was not added to the back coat layer. The deterioration of C/N ratio was great due to back imprinting after storage.

In Comparative Example 3, a smooth support having a low viscosity and a low molecular weight was used, and the same back coat layer as used in Comparative Example 2 was used. The C/N ratio was the most excellent but the dropout number was widely increased.

In Comparative Example 4, a rough support having a low viscosity and a low molecular weight was used. The same back coat layer as used in Example 1 was used. The C/N ratio was inferior. The friction was low but the support was brittle, so that the increased number of dropouts was high.

This application is based on Japanese Patent application JP 2004-24643, filed Jan. 30, 2004, the entire content of which is hereby incorporated by reference, the same as if set forth at length.

What is claimed is:

1. A magnetic recording tape comprising a magnetic layer, a flexible support and a back coat layer in this order, wherein the magnetic layer is of coating type and comprises dispersion of ferromagnetic powder in a binder and wherein the support is a polyester film having an intrinsic viscosity of from 0.40 to 0.60 dl/g and a number average molecular weight of from 12,000 to 24,000, a surface of the back coat layer has protrusions having a height of 100 nm or more measured with an atomic force microscope in a density of from 10 to 500 in 90 μm square, and a ratio of a total number of protrusions having a height of 50 nm or more on the surface of the back coat layer to a total number of protrusions having a height of 100 nm or more on the surface of the back coat layer is from 10 to 100.

2. The magnetic recording tape according to claim 1, wherein the flexible support comprises two or more layers, and a surface roughness of the support on a side having the magnetic layer is 1 nm or more and less than 6 nm, and a surface roughness of the support on a side having the back coat layer is 6 nm or more and less than 10 nm.

3. The magnetic recording tape according to claim 2, wherein the surface roughness of the support on a side having the magnetic layer is 1.5 to 5.5 nm.

4. The magnetic recording tape according to claim 2, wherein the surface roughness of the support on a side having the back coat layer is 6.5 to 9.0 nm.

5. The magnetic recording tape according to claim 1, wherein the ratio is 20 to 80.

6. The magnetic recording tape according to claim 1, wherein the polyester film has an intrinsic viscosity of from 0.43 to 0.57 dl/g.

7. The magnetic recording tape according to claim 1, wherein the polyester film has a number average molecular weight of from 14,000 to 22,000.

8. The magnetic recording tape according to claim 1, wherein a surface of the back coat layer has protrusions having a height of 100 mm or more measured with an atomic force microscope in a density of from 20 to 300 in 90 μm square.

* * * * *